A. SUNDH.
POWER TRANSMITTING DEVICE.
APPLICATION FILED OCT. 24, 1907.
986,414.
Patented Mar. 7, 1911.
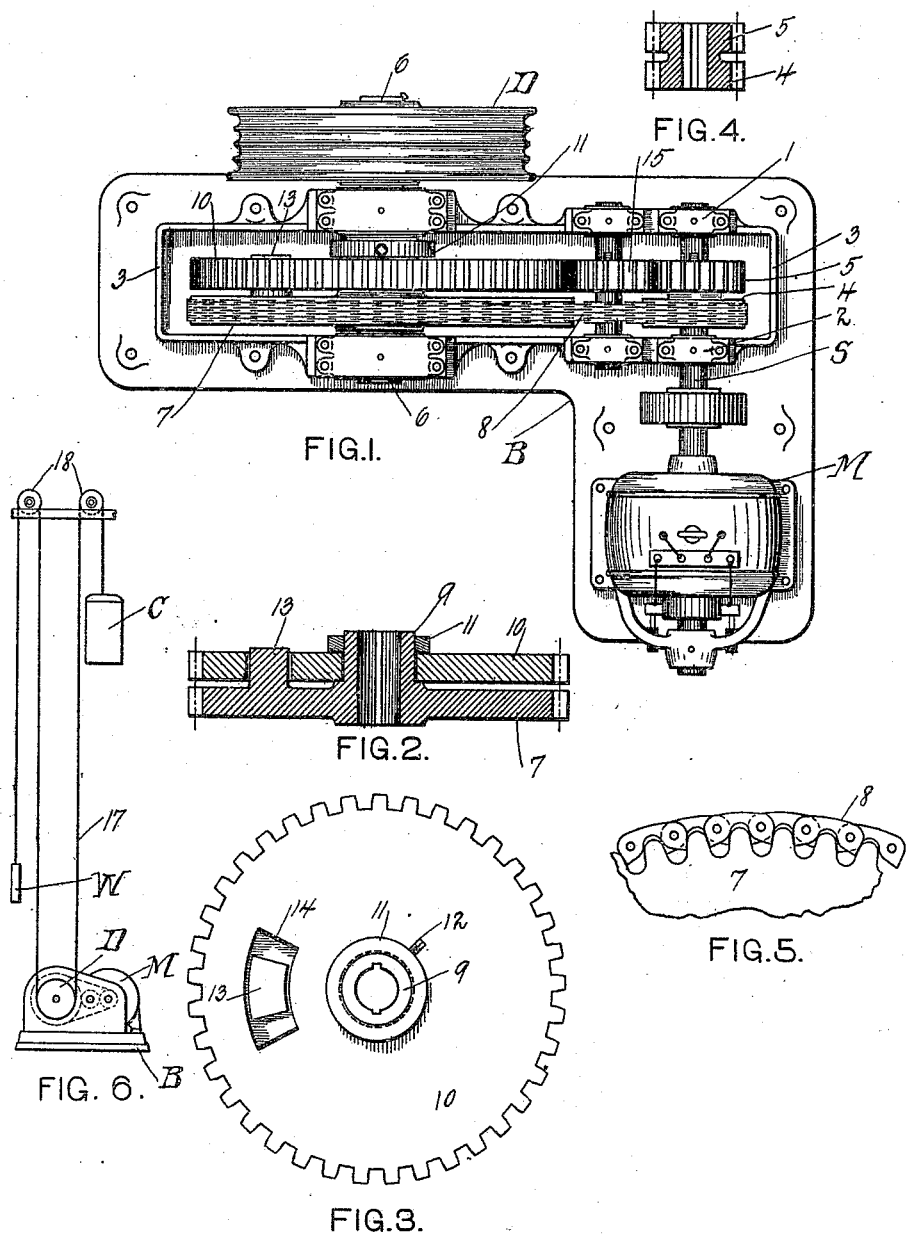

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

POWER-TRANSMITTING DEVICE.

986,414.  Specification of Letters Patent.  Patented Mar. 7, 1911.

Application filed October 24, 1907. Serial No. 398,967.

*To all whom it may concern:*

Be it known that I, AUGUST SUNDH, a citizen of the United States, residing in Yonkers, in the county of Westchester and State of New York, have invented a new and useful Improvement in Power-Transmitting Devices, of which the following is a specification.

My invention relates to power transmitting devices, and more particularly to a combined chain and gear driving or power transmitting mechanism.

One of the objects of the invention is the provision of a construction combining a chain drive and a safety device operable upon the breaking of the chain.

Another object of the invention is to so combine a chain and gear drive as to secure the advantages of both, while at the same time avoiding objectionable features incident to the use of either one alone.

Other objects will appear hereinafter, the novel combinations of elements being set forth in the appended claims.

Referring to the accompanying drawing in which is illustrated a construction embodying my invention, Figure 1 is a plan view of such construction; Fig. 2 is a cross-section of the interlocked gear wheel and sprocket wheel; Fig. 3 is an elevational view of the same; Fig. 4 is a cross-section of the integral gear and sprocket wheel; Fig. 5 is a fragmentary view of the sprocket wheel; and Fig. 6 is a diagrammatic view of an elevator to which my invention is shown applied.

In Fig. 1 is shown an electric motor M mounted on a base B and having a drive shaft S extended therefrom and journaled in bearings 1, 2 in the frame 3 secured to the base B. Keyed to the shaft S within the frame 3 are a sprocket wheel 4 and a gear wheel 5, which are preferably made in one piece as shown in Fig. 4, although they may be made separate and bolted or otherwise rigidly secured together. A driven shaft 6 is journaled in the frame 3 parallel with the drive shaft S. Keyed to the shaft 6 is a sprocket wheel 7 in alinement with the drive sprocket wheel 4, and driven by the sprocket chain 8 which extends around the sprocket wheel. The chain is of the form known as a "silent" chain, being practically noiseless in its operation. The hub of the sprocket wheel 7 is extended to form a bearing 9 on which is rotatably mounted a gear wheel 10, held against removal from the hub 9 by a ring 11 locked on the hub 9 by a set screw 12. The sprocket wheel 7 is formed with a lug 13 which extends through an arc-shaped slot 14 in the gear wheel 10. The wheels 7 and 10 are substantially the same in diameter and have the same number of teeth on their peripheries. The drive gear and sprocket wheels 5 and 4 have also an equal number of teeth. The gear wheel 10 is driven from the drive gear 5 through an intermediate idler gear 15 which serves to change the direction of rotation of the gear 10. A hoisting drum D is shown mounted on the shaft 6.

The mechanism as above described is arranged for use in a traction elevator. As shown in Fig. 6 the hoisting cables 17 which are in frictional driving engagement with the drum D, extend upwardly therefrom and over the overhead sheaves 18 and have secured to their opposite ends the elevator car C and counterweight W.

In operation, the integral gear and sprocket wheels 5 and 4 will drive the gear and sprocket wheels 10 and 7, respectively, in the same direction and at the same speed. The sprocket wheel 7 being keyed to the shaft 6, will rotate it and with it the hoisting drum D. As the lug 13 is located centrally in the slot 14 and the gear wheel 10 is loosely mounted on the hub 9, no driving power is transmitted to the drum D through the gear wheel 10. The train of gears 5, 15, 10, simply rotate the gear wheel 10 at the same speed as the sprocket wheel 7, and maintain the lug 13 in its intermediate position in the slot 14. This relation of parts will be maintained during the normal operation of the device. If, however, the chain 8 should give way, owing to overload, wear of the chain or other cause, the sprocket wheel 10 will no longer be driven by the sprocket chains, but will fall back until the lug 13 engages the end of the slot 14. The sprocket wheel 7 will then be driven by the gear wheel 10, and all the driving power for the hoisting drum will be transmitted through the gear wheels.

This construction secures the advantage of the smooth running and practically noiseless chain drive, and does away with the greater friction and noise of the gear drive, which often become excessive as the gears wear, the noise being objectionable in elevator mechanism and other places where the present invention might be applied. There being no load on the gears, there is but little wear on them. At the same time, the advantage of greater safety found in gear drives, owing to their greater strength, is also secured. This is greater than when the gear connection alone is used, as the gears are not weakened by wear. The sprocket chain or chains 8 may be made removable, so that the gear drive alone may be used if desired.

Although I have shown my invention applied to a traction elevator system by way of illustration, and as also showing a practical application thereof, it is obviously adapted to a great variety of uses. It is especially useful wherever considerable power is to be transmitted and the strength and safety of toothed gearing is desired without its attendant noise and friction and wear. The shaft 8 may be driven from any suitable source of power, and the shaft 6 may transmit power to a drum, pulley, countershaft, or other device.

Various changes in details of construction and arrangements of parts might be made without departing from the spirit and scope of the invention, and I wish therefore not to be limited to the exact construction disclosed.

What I claim as new and desire to secure by Letters Patent of the United States is:—

1. In a power-transmitting device, the combination of a driving element, a driven element, and a flexible member connecting said elements, and normally inoperative driving means for limiting the independent operation of said elements upon the disconnection of the flexible member and operating said elements at the same relative speed as said flexible member.

2. In a power-transmitting device, the combination of a drive wheel, a driven wheel, a connecting and power-transmitting element therebetween, and a second connecting and power transmitting element normally inoperative and forming a means for limiting the independent rotation of the said wheels upon the disconnection of said element and operating said wheels at the same relative speed as said first-named power transmitting element.

3. In a power-transmitting device, the combination with sprocket wheels, of a driving chain connecting the wheels, and gearing between said wheels ineffective while said chain is intact and forming means for limiting the independent rotation of the wheels upon the disconnection or giving way of the chain.

4. In a power-transmitting device, the combination of a drive wheel, a driven wheel, and a driving connection therebetween, and a second driving connection between said wheels normally inoperative and forming a means for limiting the independent rotation of the drive wheel when said connection is broken and operative when said connection is broken to drive said wheels at the same relative speed as maintained by said first-named driving connection.

5. In a power-transmitting device, the combination of a drive element, a driven element, and a driving connection therebetween, and normally inoperative driving gearing forming means for confining the independent operation of said elements within narrow limits upon the breaking of said driving connection and maintaining said elements at the same relative speed as that maintained by said driving connection.

6. In a power-transmitting device, the combination with a drive shaft, of a driven shaft, a driving connection therebetween, and a second driving connection between the shafts normally inoperative to transmit power, but operable upon the breaking of said first connection to drive the driven shaft at the same speed relative to the drive shaft as that maintained by the first-named driving connection.

7. In a power-transmitting device, the combination with a drive shaft, of a driven shaft, a sprocket wheel and chain connection therebetween, a train of gears between the shafts, and automatic interlocking means between said connection and said train of gears operable upon the breaking of said first connection.

8. In a power-transmitting device, the combination with a drive shaft and a driven shaft, of a gear wheel connection, and a sprocket wheel and chain connection between the shafts, one of said connections being operable to transmit power only upon the breaking of the other connection.

9. In a power-transmitting device, the combination with a shaft, of interlocked wheels mounted on the shaft, one loosely and the other fixed thereto, and separate means for independently driving said wheels in the same direction.

10. In a power-transmitting device, the combination with a shaft, of interlocked wheels mounted on the shaft and having a limited independent rotative movement, a drive shaft, and driving connections between each of said wheels and the drive shaft for independently driving said wheels.

11. In a power transmitting device, the combination of a rotary driving element, a sprocket wheel, a chain transmitting power between said sprocket wheel and the driving element, a train of gears comprising a gear rotatable with the driving element and a gear having the same axis of rotation as said sprocket wheel, and means independent of the said chain for limiting the relative rotation of said last-named gear and said sprocket wheel.

12. In a power-transmitting device, the combination with a shaft, of a sprocket wheel keyed thereto, a gear wheel rotatably mounted on the shaft, means for limiting the rotary movement of the gear wheel on the shaft, a sprocket chain on the sprocket wheel, a pinion in mesh with the gear wheel, and means for operating said chain and pinion to drive the gear wheel and sprocket wheel at the same angular velocity.

13. In a power-transmitting device, the combination with a shaft, and a wheel keyed thereto for rotation therewith, of a second wheel rotatably mounted on the shaft, means for limiting the rotary movement of said second wheel, and means for simultaneously rotating said wheels at the same angular velocity and with said second wheel in an intermediate rotary position on the shaft.

14. In a power-transmitting device, the combination with a drive shaft and a driven shaft, of sprocket wheels keyed to said shafts, a sprocket chain connecting the wheels, a gear wheel rotatively mounted on the driven shaft, means to limit the rotary movement of the gear wheel on the shaft, a gear wheel secured to the drive shaft, an idler pinion connecting said gear wheels, and means for driving the drive shaft, said gear wheels and sprocket wheels being proportioned to give the wheels on the driven shaft the same angular velocity when the drive shaft is rotated.

15. In a power-transmitting device, the combination with a shaft, of a wheel fixed on the shaft, a wheel rotatively mounted on the shaft, one of said wheels being formed with a slot therein, a lug formed on the other wheel and projecting through the slot to limit the rotary movement of the second named wheel, and means for simultaneously rotating the wheels independently of each other at the same angular velocity and with the lug in an intermediate position in the slot.

16. In a power-transmitting device, the combination with a drive shaft, of a sprocket wheel and a gear wheel keyed thereto, a driven shaft, a sprocket wheel keyed thereto, a drive chain connecting the sprocket wheels, a gear wheel journaled on the hub of the sprocket wheel on the driven shaft, said gear wheel being provided with a slot, a lug formed on the adjacent sprocket wheel and projecting into the slot, said slot and lug being of a size to permit a limited movement of the gear wheel on its shaft, an idler pinion between the gear wheels and in mesh therewith, means for rotating the drive shaft, and a device operated by the driven shaft.

17. The combination with a drive element of a driven element, and combined chain drive and gear drive connections each extending from one to the other of said elements and independently operable to operate the driven element in the same direction relative to the drive element.

18. The combination with a driving element, of a driven element, a sprocket and chain driving connection between said elements, and a gear connection between said elements operative only when the sprocket and chain connection is inoperative said connections both effecting the operation of the driven element in the same direction relatively to the driving element.

19. The combination with a drive element of a driven element, sprocket wheel and chain driving connection between said elements, and means to prevent independent movement beyond narrow limits of said elements when said connection is broken.

20. The combination with a drive shaft, of a driven shaft, a gear wheel and a sprocket wheel keyed to the drive shaft, a sprocket wheel keyed to the driven shaft, a gear wheel mounted on the driven shaft and having limited rotative movement thereon, a sprocket chain connecting the sprocket wheels, and an idler pinion connecting the gear wheels.

In testimony whereof, I have signed my name to this specification in the presence of two subscribing witnesses.

AUGUST SUNDH.

Witnesses:
 CHAS. M. NISSEN,
 ALFRED C. BECHET.

---

Copies of this patent may be obtained for five cents each, by addressing the "Commissioner of Patents, Washington, D. C."